(12) United States Patent
Shon et al.

(10) Patent No.: US 8,155,094 B2
(45) Date of Patent: Apr. 10, 2012

(54) METHOD FOR TRANSMITTING/RECEIVING DATA WITH TRANSFER OBLIGATION DELEGATED IN WSN

(75) Inventors: Tae-Shik Shon, Suwon-si (KR); Wook Choi, Hwaseong-si (KR); Hyo-Hyun Choi, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 881 days.

(21) Appl. No.: 12/179,705

(22) Filed: Jul. 25, 2008

(65) Prior Publication Data

US 2009/0028093 A1 Jan. 29, 2009

(30) Foreign Application Priority Data

Jul. 25, 2007 (KR) .................. 10-2007-0074748

(51) Int. Cl.
*H04W 4/00* (2009.01)
(52) U.S. Cl. ..................... 370/338; 370/328
(58) Field of Classification Search .......... 370/235–236, 370/249, 412, 428–429, 338
See application file for complete search history.

(56) References Cited

U.S. PATENT DOCUMENTS

2006/0153154 A1* 7/2006 Yoon et al. .................. 370/338
2007/0168826 A1* 7/2007 Terry et al. .................. 714/748

* cited by examiner

*Primary Examiner* — Ricky Ngo
*Assistant Examiner* — Richard K Chang
(74) *Attorney, Agent, or Firm* — Cha & Reiter, LLC (57) ABSTRACT

A method for transmitting/receiving data with transfer obligation delegated in a Wireless Sensor Network (WSN) reduces the time and power spent by a transmitting apparatus to wait for acknowledgment that a data transfer was successful. The method for transmitting data from a transmitting end to a receiving end through a set transfer route by multiple data transmit/receive apparatuses provided in a Wireless Sensor Network (WSN), typically includes the steps of: performing temporary storage of data to be transmitted on receiving a request to transmit data; requesting a data transmit/receive apparatus, existing on a next route, to transmit data while transmitting data to a data transmit/receive apparatus which is set as a transfer route; and confirming the delivery of the data to the data transmit/receive apparatus set as the transfer route, and then deleting the temporarily stored data frame.

10 Claims, 8 Drawing Sheets

METHOD FOR TRANSMITTING/RECEIVING DATA WITH TRANSFER OBLIGATION DELEGATED IN WSN

CLAIM OF PRIORITY

This application claims the benefit of priority under 35 U.S.C. §119(a) from an application entitled "Method for Transmitting/Receiving Data with Transfer Obligation Delegated in WSN" filed in the Korean Intellectual Property Office on Jul. 25, 2007 and assigned Serial No. 2007-74748, the contents of which are incorporated herein by reference in its entirety.

BACKGROUND OF THE INVENTION

1. Field of the Invention

The present invention relates to a Wireless Sensor Network (WSN) and problems associated unstable link states. More particularly, the present invention relates to the technology of transmitting/receiving data in a WSN.

2. Description of the Related Art

A WSN network differs from the existing conventional networks that have been realized for communication for at least the reason that the WSN has been embodied for the purpose of collecting remote information. The WSN is equipped with a sensor node for processing information collected via a sensor and then transfers processed information, A sink node is used for sending transferred information to outside the network. As a network is constructed of a large number of sensor nodes, the structure of each sensor node should be simply designed. Also, since a certain sensor node may be arranged in an area in which it is difficult for a person to gain access, the sensor nodes should be designed to consume a relatively small amount of electric power so that the sensor node may operate for up to several months or several years from an initial battery without requiring replacement. In addition, the sensor nodes should be designed to have mobility so that each position in which the sensor node has been installed is enabled for free movement. Furthermore, even though some sensor nodes existing within the network might become damaged, the WSN must be embodied so as not to affect the maintenance of the network.

Meanwhile, IEEE 802.15 Working Group defines the standards for a short-distance wireless network, and in particular, since IEEE 802.15.4 standards defined by the IEEE 802.15 Working Group enables a low-power short-distance wireless network to be commercially realized, the IEEE 802.15.4 standard is raising its head as core technology which is suitable for being applied to a sensor network.

Further, the WSN based on the IEEE 802.15.4 standard protocol includes proposed methods for transmitting data, respectively corresponding to three different cases.

Figure 1:
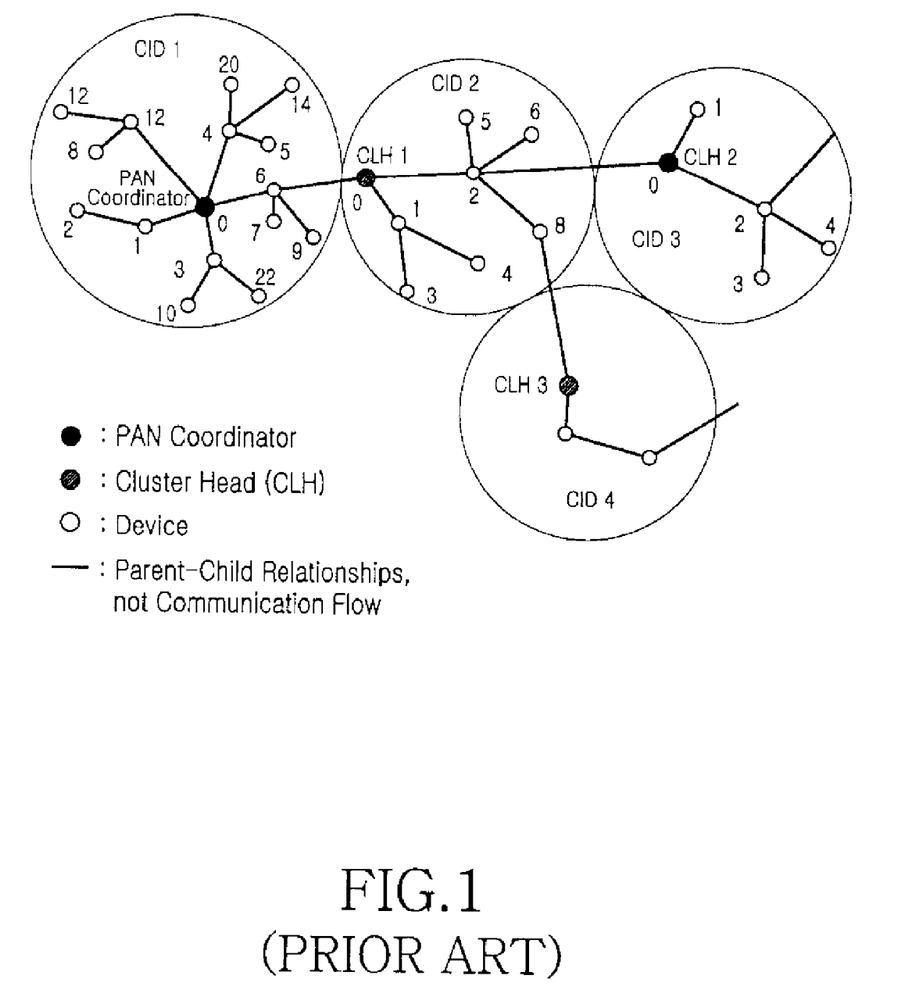
FIG. 1 is a conceptual view illustrating the conventional network structure of a WSN based on the IEEE 802.15.4 standard protocol.
Figure 2:
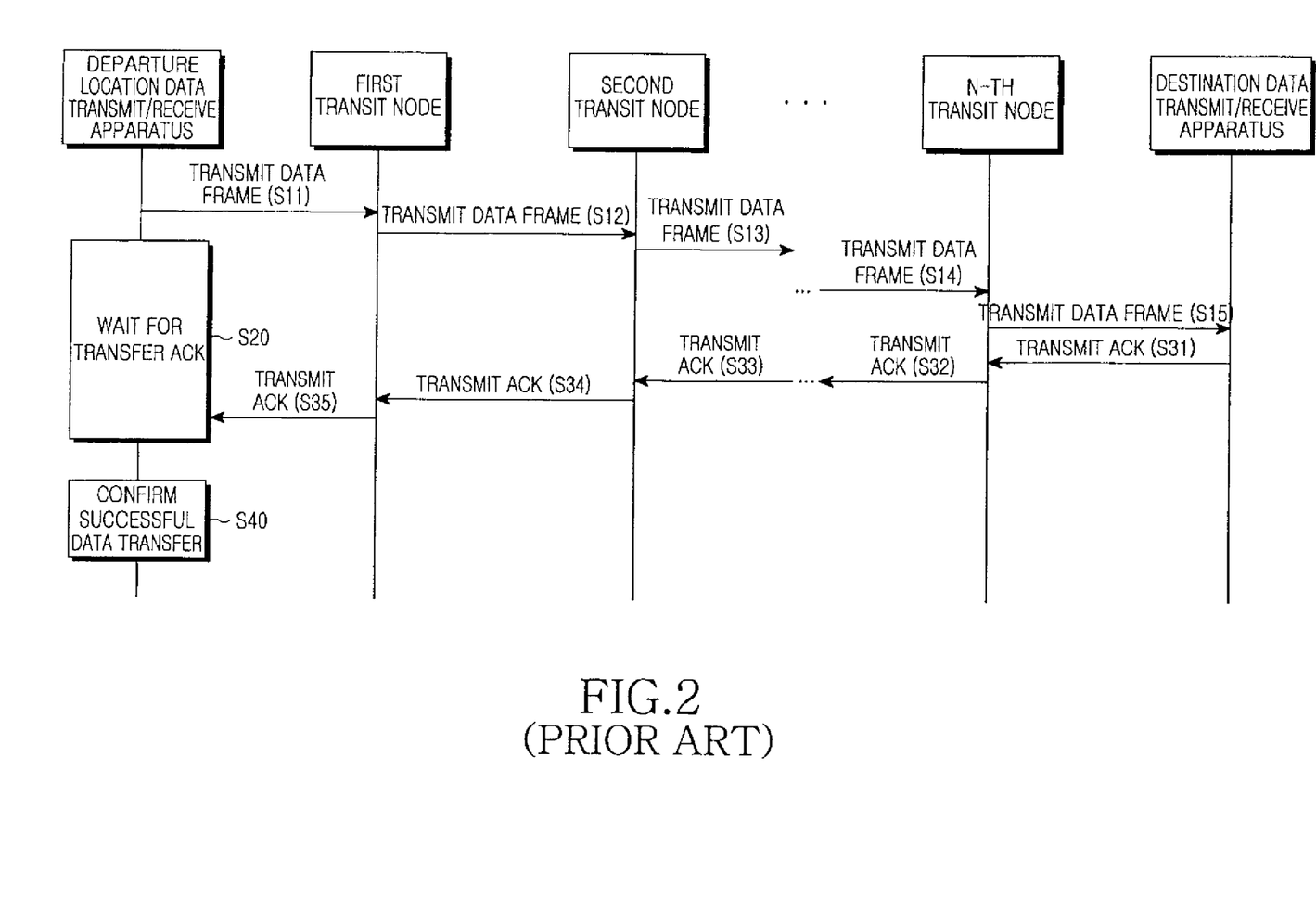
FIG. 2 is a flowchart illustrating a procedure in a case where data is normally transmitted to a destination in a conventional method for transmitting data.
Figure 3:
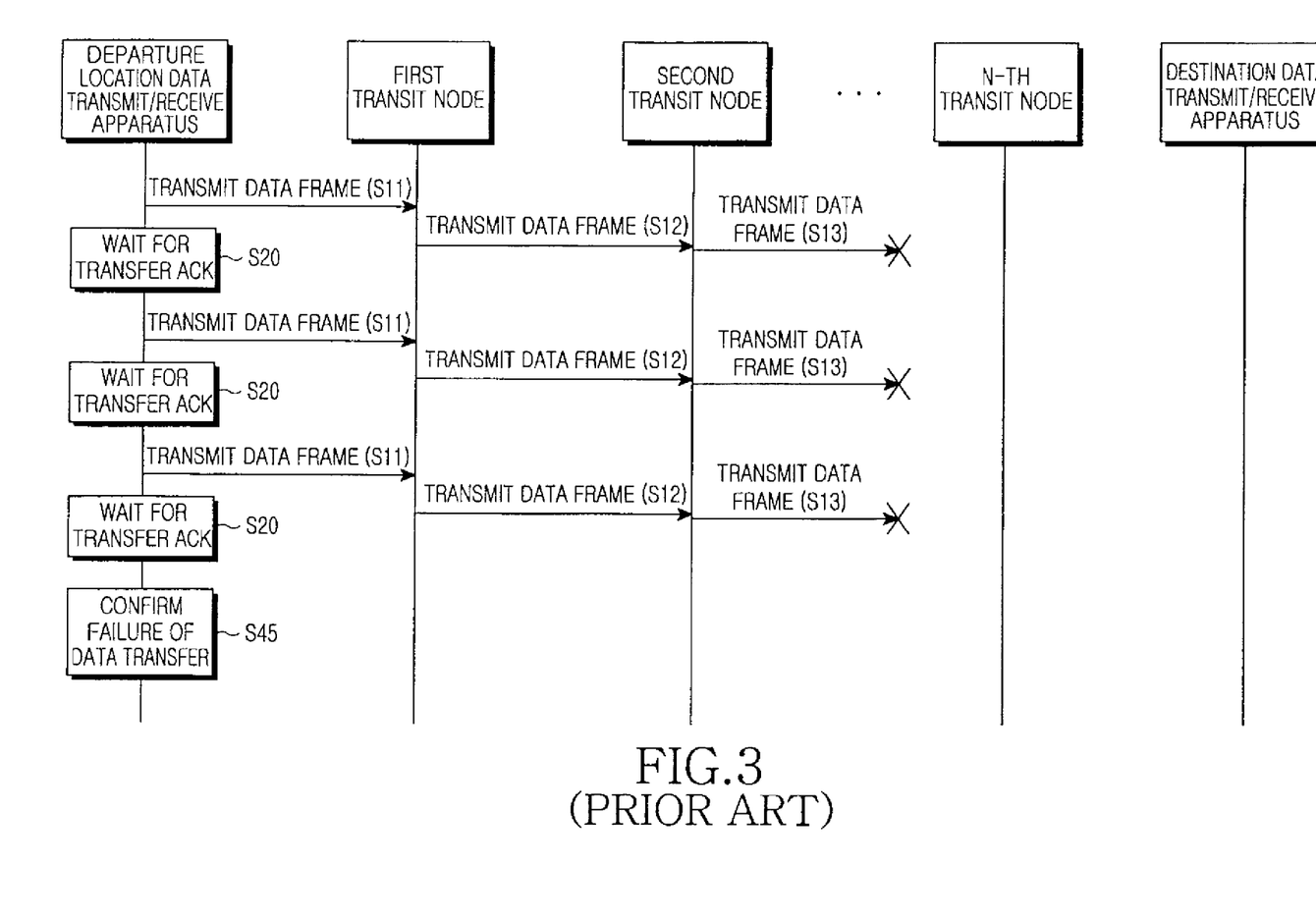
FIG. 3 is a flowchart illustrating a procedure in a case where a transmission error of a wireless link is caused in a conventional method for transmitting data.
Figure 4:
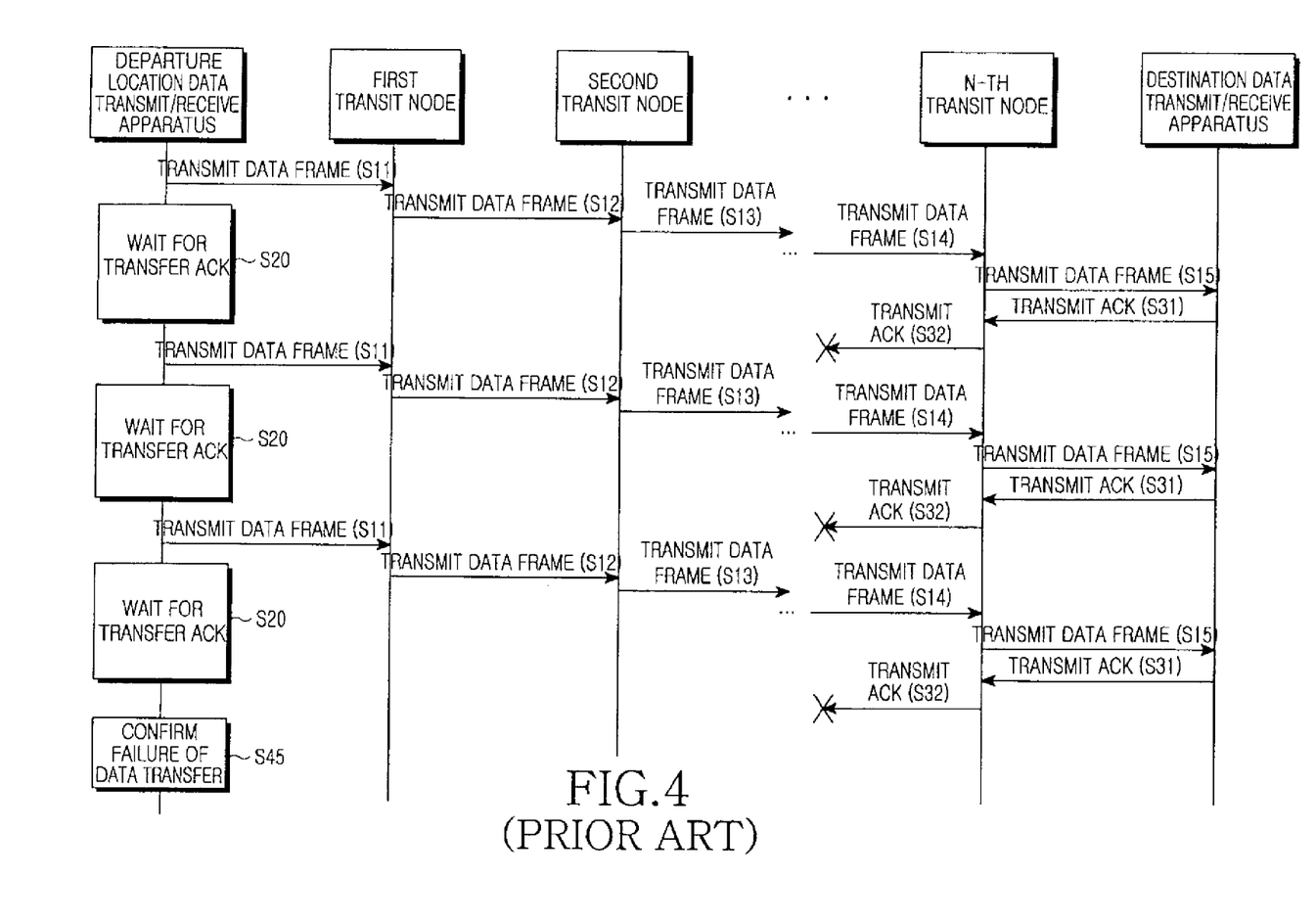
FIG. 4 is a flowchart illustrating a procedure in a case where a transmission error of a wireless link is caused in a conventional method for transmitting data.

FIG. 1 is a conceptual view illustrating the network structure of a WSN based on the IEEE 802.15.4 standard protocol according to the prior art, and FIGS. 2, 3, and 4 are flowcharts illustrating the respective processes of a method for transmitting data according to the prior art.

To begin, in FIG. 1, the WSN based on the IEEE 802.15.4 standard protocol is constructed in a network structure having a multi cluster form in which a star topology and a peer-to-peer topology are combined. Specifically, the WSN includes: a first cluster CID1 (100) realized with a Personal Area Network (PAN) coordinator as the center; a second cluster CID2 (200) which includes a first cluster hub CLH1 linked to a device included in the first cluster CID1 (100), and is realized with the first cluster hub CLH1 as the center; a third cluster CID3 (300) which includes a second cluster hub CLH2 linked to a device included in the second cluster CID2 (200), and is realized with the second cluster hub CLH2 as the center; and a fourth cluster CID4 (400) which includes a third cluster hub CLH3 linked to the second cluster CID2 (200), and is realized with the third cluster hub CLH3 as the center.

The aforementioned multi-cluster formation includes the PAN coordinator as the center. In the first place, if the PAN coordinator forms the first cluster CID1 by performing functions, including network settings, beacon transfer, node management, node information storage, and message route setting between connected nodes, devices included in the first cluster CID1 100 may scan a specified channel list so as to check for a usable communication channel. Then, if a Wireless Personal Area Network (WPAN) IDentification (ID), which is not duplicate, is selected following the completion of scanning, a Full Function Device (FFD), which can directly transmit/receive data, functions as the first cluster hub CLH1. Thereafter, if the first cluster hub CLH1 transmits a beacon frame to other devices, the devices all of which receive the beacon frame are linked to the first cluster hub CLH1, and then form the second cluster CID2 200. With the repetition of this process, the third and the fourth clusters CID3 300 and CID4 400 are embodied, and finally, one WSN is formed.

Still referring to FIG. 1, if a device 10 of the first cluster CID1 100 transmits data up to a device 3 of the second cluster CID2 200 within the WSN formed as described above, the WSN sets a route for data transfer in the first place. For example, a data transfer route can be set in a sequence, such as CID1-10→CID1-3→CID1-0→CID1-6→CID2-0→CID2-1→CID2-3. Namely, in FIGS. 2, 3, and 4, an apparatus for transmitting/receiving data (i.e., a data transmit/receive apparatus) of a departure location may be the device 10 of the first cluster CID1 illustrated in FIG. 1, and in FIGS. 2, 3, and 4, a data transmit/receive apparatus existing in a first transit node to a n-th transit node can be either the device 3 of the first cluster CID1, the device 0 of the first cluster CID1, the device 6 of the first cluster CID1, the device 0 of the second cluster CID2, or the device 1 of the second cluster CID2, illustrated in FIG. 1. In FIGS. 2, 3, and 4, a data transmit/receive apparatus of a destination can be the device 3 of the second cluster CID2 200 illustrated in FIG. 1.

Hereinafter, with reference to a configuration of the WSN exemplified as above and flowcharts depicted in FIGS. 2, 3 and 4, a description will be made in detail of a transfer process relevant to each case.

Case 1. A Successful Transfer of a Data Frame and Receipt of an ACKnowledgement (ACK) Frame:

With reference to FIG. 2, after a transfer route of a data frame is set, the data transmit/receive apparatus of the departure location transmits the data frame to a data transmit/receive apparatus located in the first transit node (step S11), and then waits for a transfer ACKnowledgement (ACK) for a predetermined waiting time (step S20). Before receiving such an acknowledgement, the data transmit/receive apparatus located in the first transit node transmits a data frame to a data transmit/receive apparatus located in the second transit node (step S12). Upon receipt of the data frame, the data transmit/receive apparatus located in the second transit node delivers a data frame to a data transmit/receive apparatus located in the next mode on the transfer route. Subsequently, data transmit/receive apparatuses located in different nodes within the transfer route repeat the above processes, and finally, deliver a data frame to a data transmit/receive apparatus of the destination apparatus (steps S13, S14, and S15). The data transmit/receive apparatus of the destination generates an ACK frame in reply to the reception of data, and then transmits the generated ACK frame (step S31). Thereafter, the data transmit/receive apparatuses located on the transfer route set during the data transfer deliver the ACK frame to the data transmit/receive apparatuses of the departure location (steps S32, S33, S34, and S35). Finally, if the data transmit/receive apparatus of the departure location receives the ACK frame (from the destination apparatus via the transit nodes) within a predetermined waiting time for which it waits for a transfer ACK, the apparatus at the departure location confirms that data has been successfully transmitted to the destination apparatus (step S40).

Case 2. An Unsuccessful Transfer of a Data Frame

With reference to FIG. 3, in the case of unsuccessful transfer of a data frame, by performing steps S11 to S13 as in the case described above (i.e., in the case of successful transfer of a data frame shown in FIG. 2), data transfer is requested, and waiting for the reception of an ACK frame is implemented (step S20).

However, a wireless link state of a preset route is unstable, and therefore, a data frame cannot be delivered up to the data transmit/receive apparatus of the destination. Accordingly, the data transmit/receive apparatus of the departure location cannot receive the ACK frame. Therefore, the data transmit/receive apparatus of the departure location fails to receive the ACK frame until a timer is terminated, and repeatedly performs steps S11 to S13 for a predetermined number of attempts.

The data transmit/receive apparatus of the departure location repeats this process up to three times, and if the data transmit/receive apparatus of the departure location cannot receive a special ACK frame, the apparatus of the departure location does not attempt to transmit the data frame again, but instead confirms that the transfer of the data frame has failed (step S45).

Case 3. The Transfer of a Data Frame has been Successful but the Transfer of an ACK Frame Fails With reference to FIG. 4, in a case where the transfer of an ACK frame has failed, as in the case described above (i.e., in the case of successful transfer of a data frame), data transfer is requested by performing steps S11 to S15, and the apparatus at the departure location waits for receipt of an ACK frame as implemented in step S20. In addition, in FIG. 4 the ACK frame is transmitted through steps S31 and S32, but fails in transit and does not reach the original sending apparatus.

However, since a wireless link state of a preset route is unstable, the ACK frame transmitted from the data transmit/receive apparatus of the destination cannot be delivered up to the data transmit/receive apparatus of the departure location.

Finally, the data transmit/receive apparatus of the departure location fails to receive the ACK frame within the time counted the timer expires. Accordingly, the data transmit/receive apparatus of the departure location, and a data transmit/receive apparatus located on the transfer route repeatedly performs steps S11 to S15. The data transmit/receive apparatus of the departure location repeats this process up to three times, and if it cannot receive a special ACK frame, it does not attempt to transmit the data frame again, but finally confirms that the transfer of the data frame has failed (step S45).

In order to embody a WSN, the reliability of each data frame transmitted among nodes must be secured. However, in the WSN based on the protocol that the prior IEEE 802.15.4 standard has proposed, as described above, nothing is done, but the re-transfer of a data frame is performed, and an alternative pertinent response to a failure of re-transfer has not been proposed.

SUMMARY OF THE INVENTION

Accordingly, the present invention has been made in part to solve at least some of the above-stated problems occurring in the art, and to provide some of the advantages as described herein below. The present invention provides a method in which the reliability of data transfer can be guaranteed by delegating the obligation of the data transfer to a data transmit/receive apparatus on a transfer route in a WSN.

In accordance with an exemplary aspect of the present invention, there is provided a method for transmitting/receiving data with transfer obligation delegated in a Wireless Sensor Network (WSN). The method for transmitting data from a transmitting end to a receiving end through a set transfer route by multiple data transmit/receive apparatuses provided in a Wireless Sensor Network (WSN) which can include the exemplary steps of: (a) performing temporary storage of data to be transmitted on receiving a request to transmit data; (b) transmitting data to a data transmit/receive apparatus which is set as a transfer route and simultaneously request command for forwarding the data to a data transmit/receive apparatus on a next route; and (c) confirming the delivery of the data to the data transmit/receive apparatus set as the transfer route, and then deleting the temporarily stored data frame.

Preferably, a data transmit/receive apparatus of a departure location, a data transmit/receive apparatus of a destination, and a data transmit/receive apparatus of at lest one transit location existing on a route connecting from the departure location to the destination repeat steps (a) to (c), and then complete data transfer from the departure location to the destination.

The exemplary method according to the present invention may further include the steps of: waiting for a transfer ACKnowledgement (ACK) for a predetermined waiting time after transmitting the data to the data transmit receive apparatus set as the transfer route; transmitting the transfer ACK to the data transmit/receive apparatus of a source in response to the reception of the data; and deleting the temporarily stored data frame as the transfer ACK is received.

Preferably, in the step of deleting a temporarily stored data frame, the temporarily stored data frame is deleted if the transfer ACK is received within a period of time during which waiting for the transfer ACK is performed, or in step (c), the temporarily stored data frame is deleted if a predetermined time interval passes after the data is transmitted to the data transmit/receive apparatus set as the transfer route.

Preferably, a data transmit/receive apparatus provided as a final receiving end transmits a final transfer ACK to a source from which the data frame is transmitted without a process of temporarily storing the data frame if the data frame is delivered to the final receiving end, and the final transfer ACK corresponds to an ACK frame indicating that the transfer of the data frame to a destination is completed.

In accordance with another exemplary aspect of the present invention, there is provided a method for transmitting data from a transmitting end to a receiving end through a set transfer route by multiple data transmit/receive apparatuses, provided in a Wireless Sensor Network (WSN). The method may includes the steps of: requesting a data transmit/receive apparatus, existing on a next route, to transmit data while transmitting data to a data transmit/receive apparatus which is set as a transfer route; performing temporary storage of transmitted data after the data is transmitted to the data transmit/receive apparatus set as the transfer route; and confirming the delivery of the data to the data transmit/receive apparatus set as the transfer route, and then deleting the temporarily stored data frame.

In accordance with further exemplary aspect of the present invention, there is provided a Wireless Sensor Network (WSN) system including a data transmit/receive apparatus of a departure location, a data transmit/receive apparatus of a destination, and a data transmit/receive apparatus of at lest one transit location existing on a route connecting from the departure location to the destination. Each data transmit/receive apparatus requests a data transmit/receive apparatus, existing on a next route, to transmit data while transmitting data to a data transmit/receive apparatus which is set as a transfer route, temporarily stores the data, confirms the delivery of the data to the data transmit/receive apparatus set as the transfer route, and then deletes the temporarily stored data frame.

Preferably, the first data transmit/receive apparatus which has delivered data to the second data transmit/receive apparatus existing on the next route confirms the delivery of the data and then waits for a transfer ACKnowledgement (ACK) for a predetermined waiting time, and the second data transmit/receive apparatus transmits the transfer ACK to the first data transmit/receive apparatus of a source in response to the reception of the data.

Preferably, the first data transmit/receive apparatus deletes the temporarily stored data frame as the transfer ACK is received from the second data transmit/receive apparatus. More preferably, the first data transmit/receive apparatus deletes the temporarily stored data frame if it receives the transfer ACK within a period of time during which it waits for the transfer ACK.

Preferably, the first data transmit/receive apparatus may delete the temporarily stored data frame if a predetermined time interval passes after delivering the data to the second data transmit/receive apparatus.

Preferably, if the data transmit/receive apparatus of the destination receives the data, it transmits a final transfer ACK to a source from which the data is transmitted without temporarily storing the data frame, and the final transfer ACK corresponds to an ACK frame indicating that the transfer of the data frame to the destination is completed.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. The next description includes particulars, such as specific configuration elements, which are only provided for illustrative purposes in order to facilitate a more comprehensive understanding of the present invention, and those of ordinary skill in the art understand and appreciate that prescribed changes in form and modifications may be made to the particulars in the scope of the present invention. For the purposes of clarity and simplicity, a detailed description of known functions and configurations incorporated herein may be omitted when their inclusion may obscure appreciation of the subject matter of the present invention by a person of ordinary skill in the art.

In the examples provided herein of the present invention, each data transmit/receive apparatus located on a transfer route temporarily stores a data frame, and then delivers the stored data frame to a data transmit/receive apparatus located in the next node. According to examples of this method, by delegating the obligation of data transfer to a data transmit/receive apparatus located in the next node, a data frame is transmitted from a departure location to a destination.

Hereinafter, a detailed description will be made of a method for transmitting/receiving data according to an exemplary embodiment of the present invention.

To begin, in order for each device to be able to transmit/receive a data frame, each device must be connected and synchronized with one another via a wireless channel, is assigned an address thereof, and thereby, form a WSN. In an exemplary embodiment of the present invention, it is assumed that a WSN is formed by a method such as proposed in the IEEE 802.15.4 protocol or the Zigbee protocol. Also, it is assumed that a route from a departure location to a destination is set ahead of data transmit/receive in the WSN.

Figure 5A:
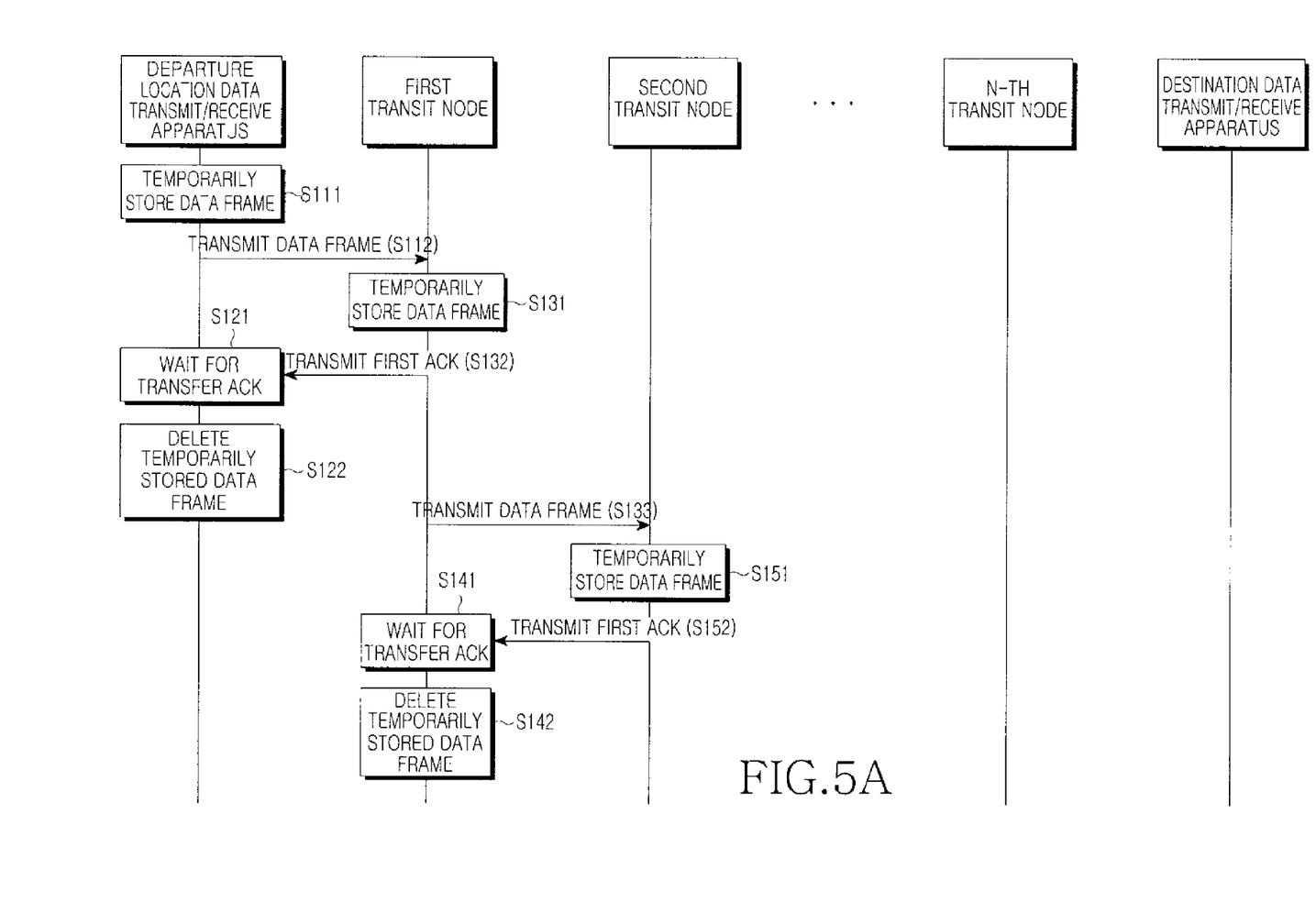
FIGS. 5A and 5B show a flowchart illustrating a procedure in a case where data is normally transmitted to a destination in a conventional method for transmitting/receiving data according to an exemplary embodiment of the present invention.
Figure 5B:
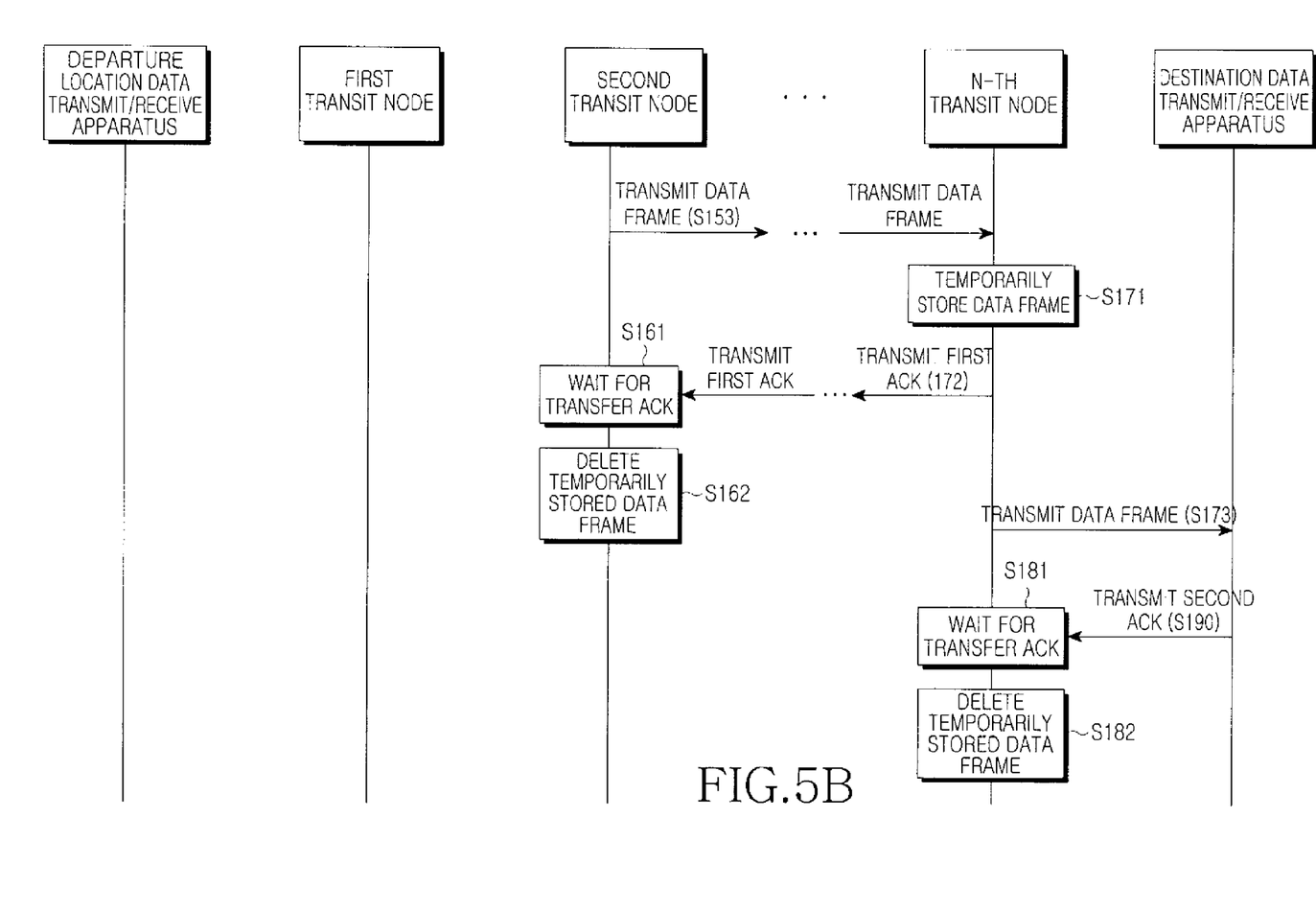

FIGS. 5A and 5B show a flowchart illustrating examples of a procedure in a case where a data frame is normally transmitted to a destination in a method for transmitting/receiving data according to an exemplary embodiment of the present invention.

In a method for transmitting/receiving data according to an exemplary embodiment of the present invention, first of all, a data transmit/receive apparatus of the departure location temporarily stores a data frame to be transmitted in a cache memory (step S111). Then, the data transmit/receive apparatus of the departure location transmits the data frame to a first transit node of a preset route (step S112). Thereafter, the data transmit/receive apparatus of the departure location confirms that the data frame has been transmitted to the first transit node, changes a state thereof to a state where it can receive a transfer ACKnowledgement (ACK), enables a timer to operate, and then waits for the transfer ACK during a predetermined period of time (step S121).

Still referring to FIG. 5A, a data transmit/receive apparatus located in the first transit node receives a data frame which includes a instruction frame necessary to request a data transmit/receive apparatus located in the next node (i.e., a second transit node) of the transfer route to transmit a data frame. Hence, in order to transmit the data frame to the data transmit/receive apparatus located in the second transit node, the data transmit/receive apparatus located in the first transit node temporarily stores the data frame (step S131). In addition, the data transmit/receive apparatus located in the first transit node transmits a first ACK frame to the data transmit/receive apparatus of the departure location (step S132), where the first ACK frame confirms that the data transmit/receive apparatus located in the first transit node has received the data frame. Thus, once the first transit node receives the data frame and confirms receipt, the data transmit/receive apparatus of the departure location receives the first ACK frame while counting a reply waiting time, confirms that the data has been stably transmitted to the data transmit/receive apparatus located in the first transit node, and then deletes the temporarily stored data frame (step S122). Thus, the amount of time spent by the departure apparatus waiting for a reply is significantly shortened.

Further, the data transmit/receive apparatus located in the first transit node transmits a data frame to a data transmit/receive apparatus located in a second transit node (step S133), and then waits for a transfer ACK from the data transmit/receive apparatus located in the second transit node (step S141). If that happens, the data transmit/receive apparatus located in the second transit node temporarily stores the data frame (step S151), and then transmits a first ACK frame to the data transmit/receive apparatus located in the first transit node (step S152). In the meantime, the data transmit/receive apparatus located in the first transit node, which receives the first ACK frame in a process of waiting for a transfer ACK, deletes the temporarily stored data frame (step S142).

As shown in FIG. 5B, until a data frame is delivered to a data transmit/receive apparatus of the destination, each data transmit/receive apparatus located on the transfer route repeats a process (step S153) of transmitting a data frame, a process (steps S161 and S181) of waiting for a transfer ACK, a process (steps S162 and S182) of deleting temporarily stored data, and a process of performing temporary storage of data following the reception of data (step S171) and then transmitting a first ACK frame (step S172).

Subsequently, if the data frame is finally delivered to the data transmit/receive apparatus of the destination (step S173), the data transmit/receive apparatus of the destination refers to a destination address included in the data frame, and then confirms that the data frame corresponds to data that is finally delivered to itself.

The temporary storage of a data frame is performed by the transmission apparatus and the first to nth transit nodes so as to delegate the transfer obligation of the data frame to the next transit node. However, the data transmit/receive apparatus of the destination need not transmit a data frame to another device any more (it the data has reached its destination), and accordingly does not have to perform the temporary storage of the data frame. Thus, it is preferable (but not required) that the data transmit/receive apparatus of the destination does not temporarily store a received data frame for a special use.

Also, each data transmit/receive apparatus located on the transfer route transmits a first ACK back to a node which has transmitted a data frame to it in order to indicate that it receives the data frame between nodes. However, desirably, the data transmit/receive apparatus of the destination generates a second ACK necessary to give notice that the data frame has finally been transmitted to the destination, and then transmits the generated second ACK to a source which transmits data to it (step S190).

Figure 6A:
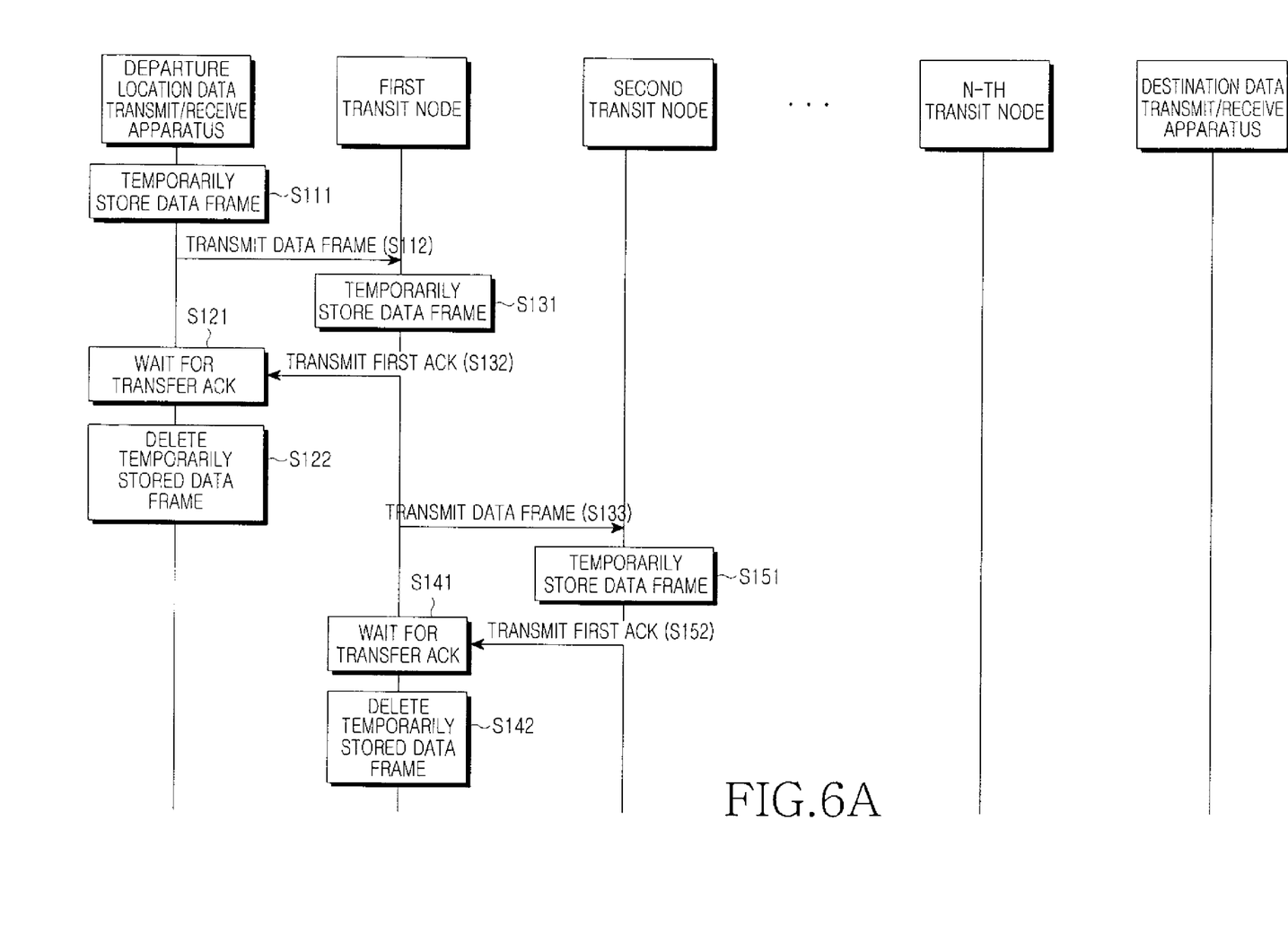
FIGS. 6A and 6B show a flowchart illustrating a procedure in a case where a transmission error of a wireless link is caused in a method for transmitting/receiving data according to an exemplary embodiment of the present invention.
Figure 6B:
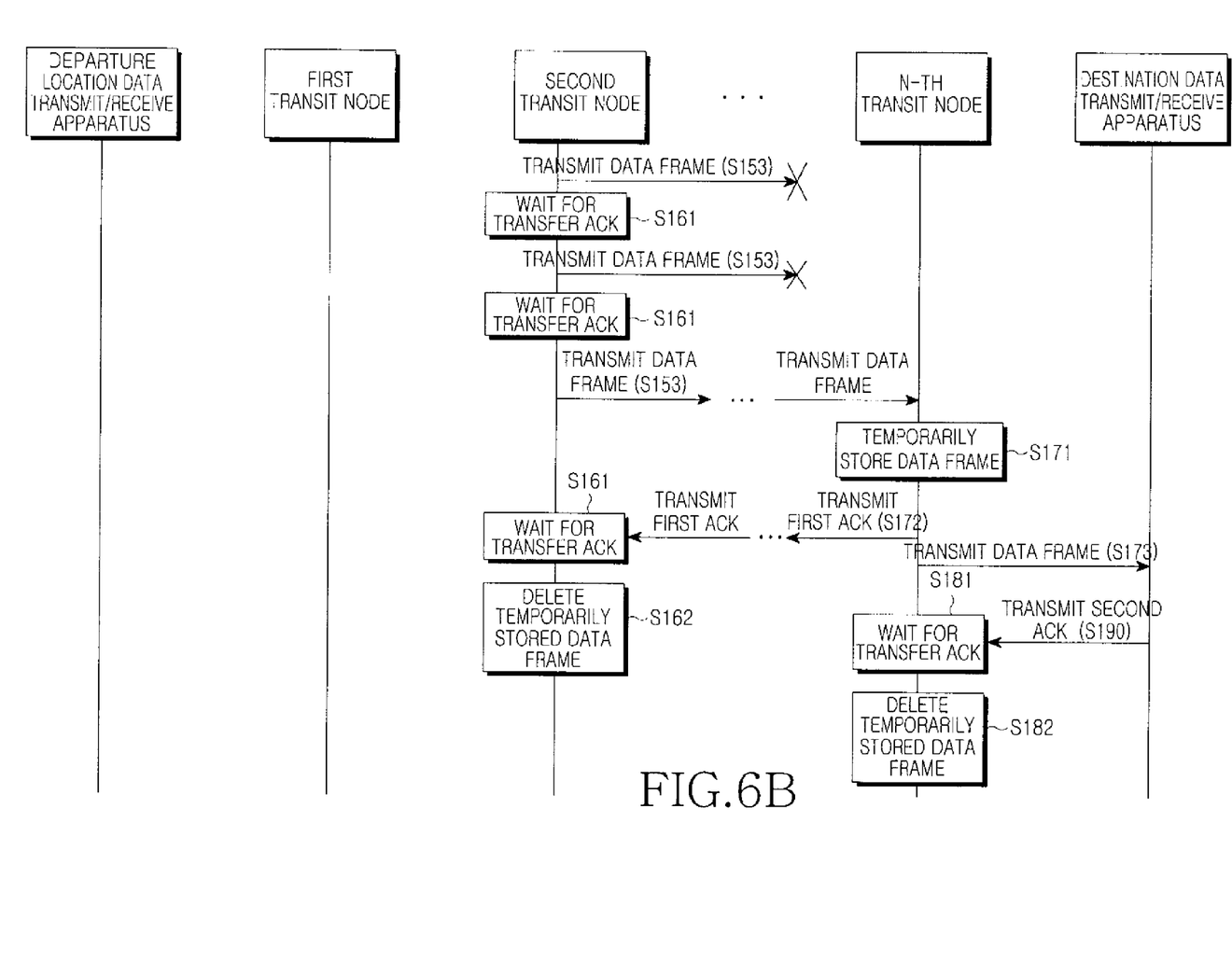

FIGS. 6A and 6B show a flowchart illustrating a procedure in a case where a transmission error of a wireless link is caused in a method for transmitting/receiving data according to an exemplary embodiment of the present invention.

The exemplary method for transmitting/receiving data depicted in FIGS. 6A and 6B is the same as the method described above with reference to FIGS. 5A and 5B. However, there is the difference between the two methods in that the transfer of a data frame fails due to an unstable wireless link state between specific nodes. Namely, the method for transmitting/receiving data depicted in FIGS. 6A and 6B corresponds to a case where data transmitted from a second transit node is not delivered to another node located on a next transfer route.

Now referring to FIGS. 6A and 6B, following the reception of a data frame from a first transit node, a data transmit/receive apparatus located in the second transit node temporarily stores the received data frame in a cache memory (step S151 in FIG. 6A), and then transmits a first ACK (step S152 FIG. 6A) to a data transmit/receive apparatus located in the first transit node. In addition, the data transmit/receive apparatus located in the second transit node transmits the above data frame to a node located on a next transfer route (step S153), and then waits for a transfer ACK for a predetermined time interval (step S161).

However, as shown in FIG. 6B, since a state of a wireless link between the second transit node and a node (e.g., a third transit node) located on a next transfer route is unstable, the transfer of the data frame fails. Accordingly, as a waiting time interval during which the second transit node waits for the transfer ACK expires, the second transit node does not receive a separate first ACK. After all, the second transit node considers the data transfer unsuccessful to retransmit data temporarily stored in the cache memory (step S153), and then waits for a transfer ACK again (step S161).

Nevertheless, as the state of the wireless link between the second transit node and the node (e.g., the third transit node) located on the next transfer route is not yet stable, the transfer of the data frame fails again. If that happens, the second transit node cannot receive a separate first ACK within a waiting time interval during which it waits for the transfer ACK, and then considers the data transfer unsuccessful. Thereafter, the second transit node retransmits the data temporarily stored in the cache memory (step S153), and then waits for a transfer ACK again (step S161).

Now, in the case where the unstable state of the wireless link between the second transit node and the node (e.g., the third transit node) located on the next transfer route becomes stable, and accordingly, the transfer of a data frame up to the node located on the next transfer route is successful. With this, the node located on the next transfer route temporarily stores the received data frame (step S171), and then transmits a first ACK frame to the second transit node (step S172). If that happens, the second transit node that waits for the transfer ACK receives the first ACK frame at this point in time, and then confirms the successful transfer of the data frame to delete the temporarily stored data frame (step S162).

Further, in an exemplary embodiment of the present invention, a data frame is temporarily stored in a cache memory before delivering the data frame to a data transmit/receive apparatus located on a next transfer route. Performing temporary storage of a data frame in a cache memory is for reading in a temporarily stored data frame to retransmit the read data frame if the data frame is not transmitted up to a data transmit/receive apparatus located in a next node on a route. Hence, the present invention is not limited to storing a data frame ahead of the transfer of the data frame. Namely, it is also possible that a data frame is stored after the data frame is transmitted to a data transmit/receive apparatus located in a next node on a route.

Still further, a data transmit/receive apparatus transmits a data frame to a data transmit/receive apparatus located on a next route up to a predetermined number of times, and determines that the transfer of the data frame failed if the predetermined number of times has been exceeded. Herein, the predetermined number of times corresponds to the number of times determined by experience or an experiment, and can be a predetermined number of times determined in consideration of how many times transfer can be successful through retransfer when the transfer of a data frame fails in a network. In the present invention, it is exemplified that a predetermined number of times corresponds to a definite number of times, but the present invention is not limited to this. For example, the number of times can be adjusted in consideration of wireless link states among data transmit/receive apparatuses.

Also, in an exemplary embodiment of the present invention, after a data frame is transmitted to a data transmit/receive apparatus located on a next route, a transfer ACK is received and then a temporarily stored data frame is deleted. However, the present invention is not limited to this. For instance, if it is determined that the transfer of a data frame has failed, since a data transmit/receive apparatus does not transmit a data frame any longer, the data transmit/receive apparatus can delete a temporarily stored data frame. In another aspect, regardless of whether it is successful to transmit the data frame up to the data transmit/receive apparatus located on the next route, it is also possible to delete the temporarily stored data frame after a prescribed time interval passes.

According to a method for transmitting/receiving data of the present invention as described above, even though a link state between specific nodes among transfer routes used to transmit data is unstable and accordingly the transfer of a data frame fails, without the necessity of transmitting data from the data transmit/receive apparatus of a departure location again, the data frame can be transmitted within a section where the transfer of the data frame fails. Also, the data transmit/receive apparatus of the departure location to a destination does not have to wait for a transfer ACK until a data frame is completely transmitted up to a destination. Therefore, a transfer ACK waiting time of the data transmit/receive apparatus of the departure location can be significantly reduced.

Furthermore, if each data transmit/receive apparatus sequentially and repeatedly transmits multiple data frames, it needs not wait for a transfer ACK over a long waiting time interval until the transfer of the next data frame begins after a single data frame is completely transmitted from the departure location to the destination. Namely, when it is successful to deliver up to the next node on the transfer route, the next data frame can be transmitted immediately.

While it is exemplified that a WSN is formed in a method proposed in the IEEE 802.15.4 protocol or the Zigbee protocol in an exemplary embodiment of the present invention, the present invention is not limited to this, if a WSN for data transmit/receive is embodied, that will do.

Some of the advantages and effects of the exemplary embodiments of the present invention, and typical/preferable configurations to operate as described above, will be described as follows.

According to a method for transmitting/receiving data of the present invention, as a waiting time interval during which each data transmit/receive apparatus waits for a transfer ACK is reduced, the transmission efficiency of data thereby increases, and electric power required in data transfer can also be reduced. Also, if multiple data frames are sequentially and repeatedly transmitted, the next data frame can be transmitted immediately when data transfer between nodes is completed, and accordingly, the time required to complete data transfer of multiple frames can be reduced.

While the invention has been shown and described with reference to certain exemplary embodiments thereof, it will be understood by those skilled in the art that various changes in form and details may be made therein without departing from the spirit and scope of the invention. Therefore, the spirit of the present invention and the scope of the appended claims are not limited to the exemplary embodiments shown and described herein above.

For example, a predetermined interval can be the same for each of the transit nodes, or within a predetermined range of time. Moreover, each of the transit nodes may repeats sending a data frame for a predetermined number of times, and that number can be the same or vary according to each node.

What is claimed is:

1. A method for transmitting data from a transmitting end to a final receiving end through a transfer route set of multiple data transmit/receive apparatuses identified as one of a next, next +1 to next +n transmit/receive apparatuses provided in a Wireless Sensor Network (WSN), the method comprising the steps of:
   (a) performing temporary storage of data frame by a source (departure) transmit/receive apparatus for transmission to a requestor in response to receiving a request to transmit data;
   (b) transmitting data to a next transit data transmit/receive apparatus of the multiple data transmit/receive apparatuses which is set as a transfer route and simultaneously requesting command for forwarding the data to a next +1 transit data transmit/receive apparatus on a next route; and
   (c) deleting the temporarily stored data frame upon one of: confirming delivery of the data to the next data transmit/receive apparatus set as the transfer route and after a predetermined time interval elapses after the data is transmitted to the next transit data transmit/receive apparatus set as the transfer route; and
   confirming receipt of the data frame being delivered to the final receiving end, wherein the final receiving end transmits a final transfer ACK to the source data transmit/receive apparatus from which the data frame is transmitted without temporarily storing the data frame, said final transfer ACK operating as the first ACK in an immediately prior node.

2. The method as claimed in claim 1, wherein each data transmit/receive apparatus sequentially performs the steps of forwarding temporary storage of data frame, transmitting data to a next +1 transit data transmit/receive apparatus and confirming the delivery of the data to the destination data transmit/receive apparatus, then completing data transfer from the departure location to the destination.

3. The method as claimed in claim 1, further wherein said confirming receipt of data comprising the steps of: waiting for a transfer ACKnowledgement (ACK) for a predetermined waiting time after transmitting the data to the next +1 transit data/transmit receive apparatus set as the transfer route.

4. The method as claimed in claim 1, wherein the final transfer ACK corresponds to an ACK frame indicating that the transfer of the data frame to a destination has been completed.

5. The method according to claim 1, wherein the next data transmit/receive apparatus comprises a first transit node, the next +1 data transmit/receive apparatus comprises a second transit node, and the next +n data transmit/receive apparatus comprises an n-th transit node.

6. The method according to claim 1, wherein the next data transmit/receive apparatus comprises a first transit node, the next +1 data transmit/receive apparatus comprises a second transit node, and the next +n data transmit/receive apparatus comprises an n-th transit node, and wherein the predetermined interval is the same for each of the transit nodes.

7. The method according to claim 1, wherein the next data transmit/receive apparatus comprises a first transit node, the next +1 data transmit/receive apparatus comprises a second transit node, and the next +n data transmit/receive apparatus comprises an n-th transit node, and wherein the predetermined interval for each of the transit nodes is within a predetermined range of time.

8. The method according to claim 1, wherein the next data transmit/receive apparatus comprises a first transit node, the next +1 data transmit/receive apparatus comprises a second transit node, and the next +n data transmit/receive apparatus comprises an n-th transit node, and if the predetermined interval expires, each of the transit nodes repeats sending a data frame for a predetermined number of times.

9. The method according to claim 8, wherein the predetermined number of times is within a predetermined range for each individual transit node.

10. A method for transmitting data from a transmitting end to a final receiving end through a set transfer route by multiple data transmit/receive apparatuses provided in a Wireless Sensor Network (WSN), the method comprising the steps of:

transmitting data to a data transmit/receive apparatus which is set as a transfer route and simultaneously providing a command for forwarding the data to a next data transmit/receive apparatus on the transfer route;

performing temporary storage of transmitted data after the data is transmitted to the next data transmit/receive apparatus on the transfer route; and confirming the delivery of the data to the next data transmit/receive apparatus set as the transfer route, and then deleting the temporarily stored data frame upon one of:

confirmation delivery of the data to the next data transmit/receive apparatus set as the transfer route and after a predetermined time interval elapses after the data is transmitted to the next transit data transmit/receive apparatus set as the transfer rout; and confirming receipt of the data being delivered to the final receiving end, wherein the final receiving end transmits a final transfer ACK to the source transmitting end from which the data is transmitted without temporarily storing the data, said final transfer ACK operating as the first ACK in an immediately prior node.

* * * * *